US006853885B2

(12) United States Patent
Maeder

(10) Patent No.: US 6,853,885 B2
(45) Date of Patent: Feb. 8, 2005

(54) METHOD FOR PROCESSING SIGNALS PRODUCED BY PIEZOELECTRIC SENSORS MOUNTED IN A ROADWAY FOR MEASURING THE SPEED OF VEHICLES

(75) Inventor: Claude Maeder, Nancy (FR)

(73) Assignee: Electronique Contrôle Mesure, Vandoeuvre les Nancy (FR)

( * ) Notice: Subject to any disclaimer, the term of this patent is extended or adjusted under 35 U.S.C. 154(b) by 61 days.

(21) Appl. No.: 10/268,506

(22) Filed: Oct. 10, 2002

(65) Prior Publication Data

US 2003/0074113 A1 Apr. 17, 2003

(30) Foreign Application Priority Data

Oct. 11, 2001 (FR) ............................................ 01 13108

(51) Int. Cl.[7] ............................ G05D 1/00; G06F 15/00

(52) U.S. Cl. ........................................... 701/1; 702/142

(58) Field of Search ............................ 701/1, 117–119, 701/121; 702/96, 98, 104, 138, 142, 146–149, 189–190, 194, 197, 199; 340/545.4, 669–670, 933, 936; 324/160–163, 166, 178–180

(56) References Cited

U.S. PATENT DOCUMENTS 5,621,314 A * 4/1997 Beck et al. ................. 324/179
6,373,402 B1 * 4/2002 Mee ........................... 340/937

FOREIGN PATENT DOCUMENTS

| | | |
|---|---|---|
| EP | 0502803 | 9/1992 |
| FR | 2567550 | 1/1986 |
| FR | 2575827 | 7/1986 |
| FR | 2673717 | 9/1992 |
| FR | 2673749 | 9/1992 |
| FR | 2703374 | 10/1994 |

* cited by examiner

*Primary Examiner*—Thu V. Nguyen
(74) *Attorney, Agent, or Firm*—Gary M. Cohen

(57) ABSTRACT

The invention relates to an analog and digital processing method which samples signals provided by two piezoelectric method C1 and C2, making it possible to determine several speeds of a vehicle per axle.

16 Claims, 8 Drawing Sheets

METHOD FOR PROCESSING SIGNALS PRODUCED BY PIEZOELECTRIC SENSORS MOUNTED IN A ROADWAY FOR MEASURING THE SPEED OF VEHICLES

BACKGROUND OF THE INVENTION

The present invention relates to a method for analog and digital processing of signals provided by piezoelectric sensors implanted in a roadway in order to allow the speed of vehicles passing over the roadway to be measured.

Techniques are known for producing piezoelectric sensors, and for their placement. For example, French Patent Nos. 2703374, 2567550, etc., use coaxial sensors with ceramic isolation. The disclosed sensors are coaxial linear sensors with a small diameter of between 1 and 8 mm. Other sensors, with plastic isolation (PVDF or piezopolymer), may also be used.

SUMMARY OF THE INVENTION

The object of the present invention is to measure several speeds when a vehicle passes by, with at least two speed measurements for each wheel or each axle. Multiple speed measurements have the advantage of enabling the determination of a mean speed for each axle, followed by the determination of a mean speed of the vehicle, and an elimination of abnormal measurements.

The advantages of the method of the present invention will become apparent from the description which is provided below, taken together with the following drawings.

BRIEF DESCRIPTION OF THE DRAWINGS

FIGS. 2*a* and 2*b* show two sensors installed at an angle of 15 to 30°, and the signal obtained when the wheels of a vehicle pass by.

DETAILED DESCRIPTION OF THE INVENTION

French Patent No. 2673717 describes methods for processing signals on input impedances of 10 MΩ, and of about 40 to 100 kΩ, respectively, and explains the advantages and drawbacks of the described methods.

Figure 1:
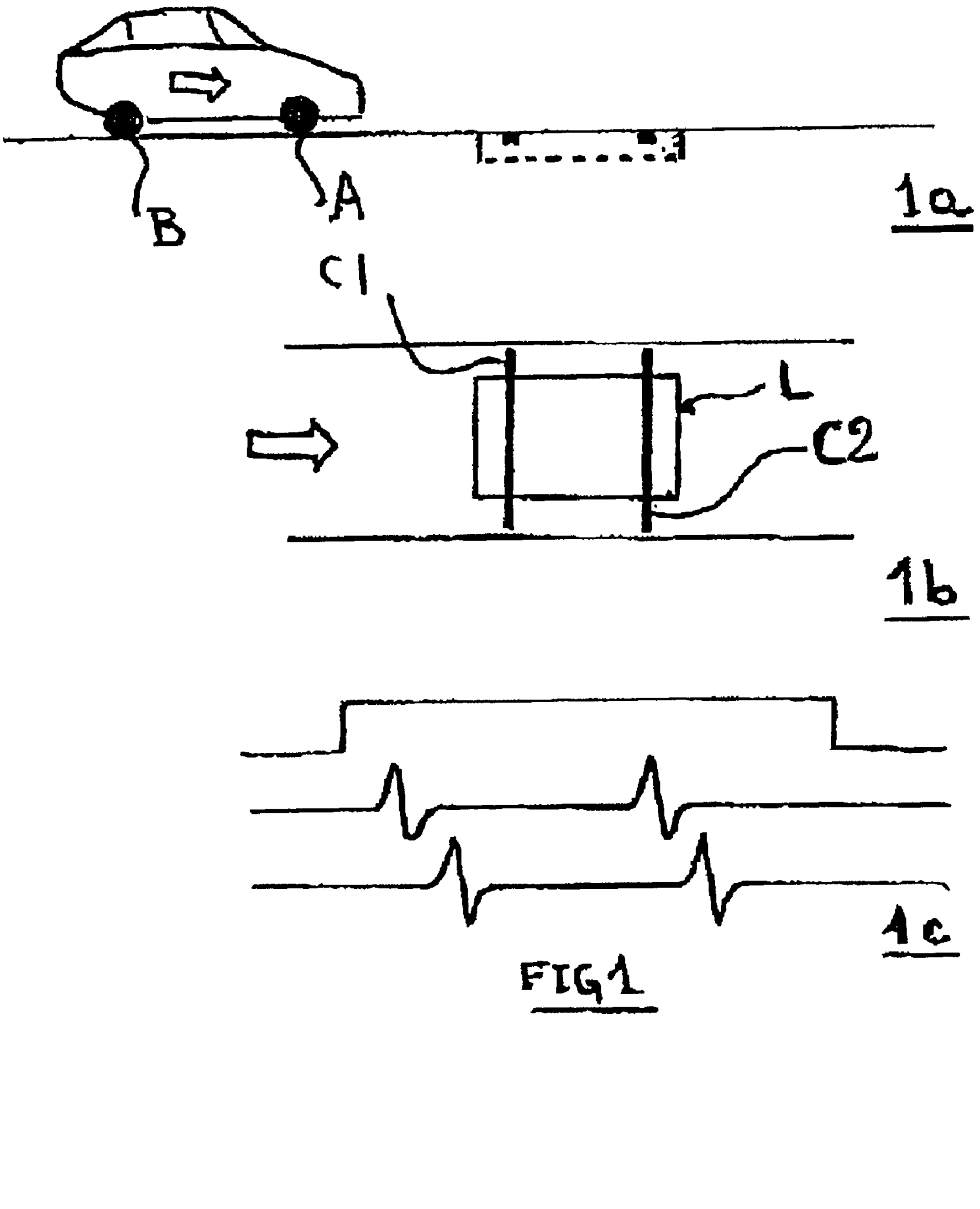
FIGS. 1*a* and 1*b* show the installation, in the ground, of two piezoelectric sensors placed perpendicular to the flow of traffic, and an induction loop.
FIG. 1*c* shows the signals obtained on the induction loop detector and on the piezoelectric sensors, with a suitable impedance.
Figure 4:
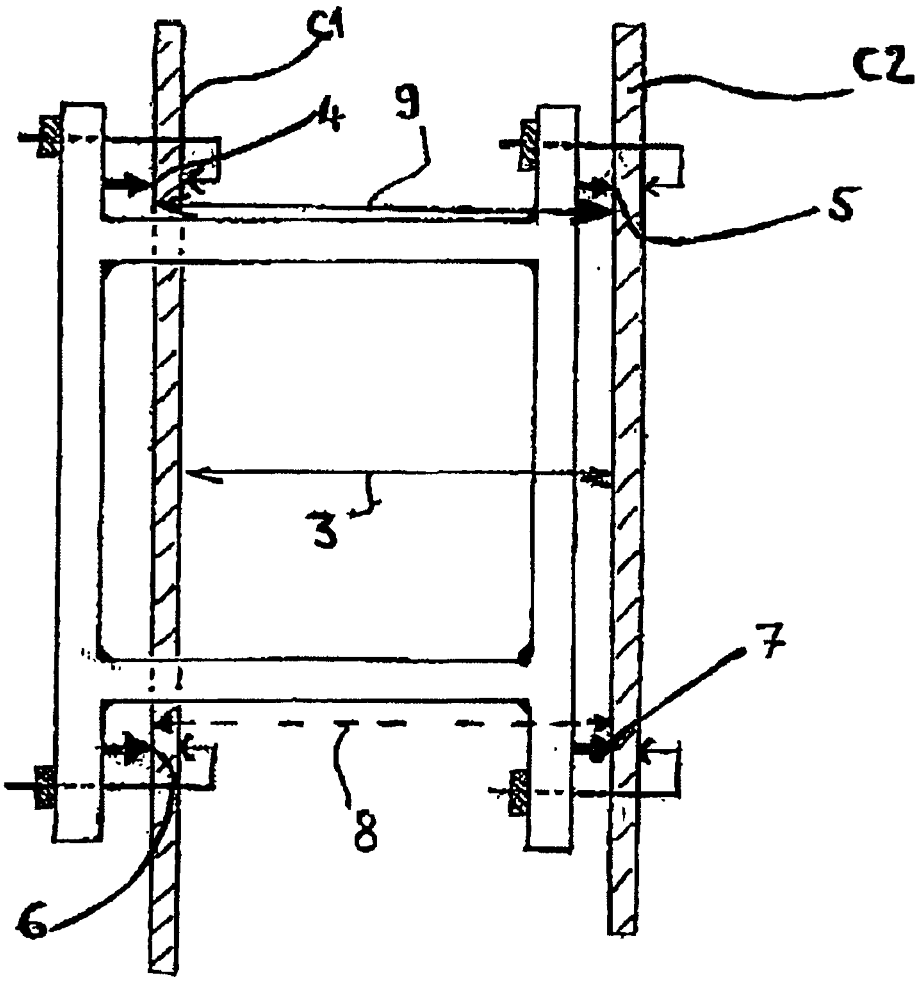
FIG. 4 shows a tool for assembling two sensors parallel to each other, and with a known separation.

To carry out a correct speed measurement, and referring to FIG. 1*b*, the two sensors (C1) and (C2) must be strictly parallel. In order to do this, an assembly tool, such as the tool shown in FIG. 4, can be used. Such a tool will guarantee parallel assembly of the sensors (C1) and (C2), and a known separation (3) between the two sensors. In this assembly, the sensors (C1) and (C2) will be placed perfectly parallel in position by machining four contact points (4), (5), (6) and (7) on the supports, having equal separations (8) and (9). The separations are controlled and measured on a 3D machine. In this way, the separation between the two sensors will be known, fixed and independent of the region in the traffic lane in which the vehicle will pass.

Figure 3:
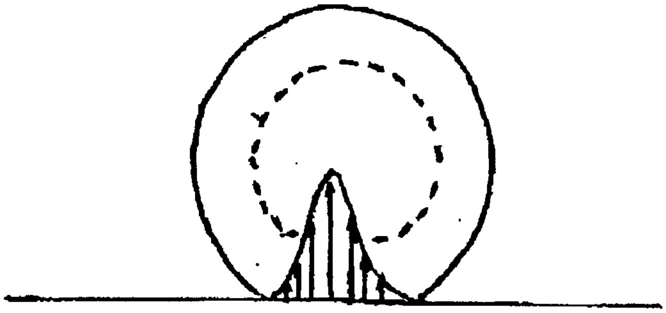
FIG. 3 shows the force generated by a tire on the road as a function of its longitudinal pressure.

FIG. 3 shows the distribution of vertical forces generated by a tire in contact with the road.

Figure 5:
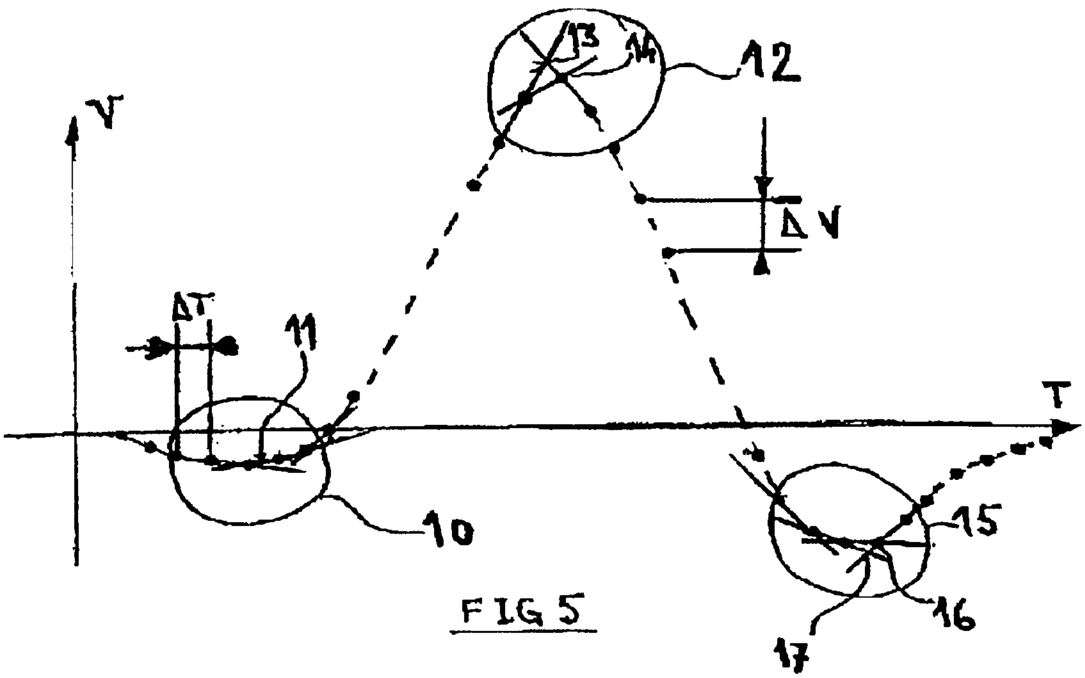
FIG. 5 shows the signal obtained with an input impedance of 10 MΩ when the tire of FIG. 3 passes over a sensor, and its digitization.

To first examine processing of the signal with an impedance of about 10 MΩ, FIG. 5 represents digitization of the resulting signal when a wheel, or an axle, passes over the sensor. The time difference between two measurement points ΔT will be given by the scan speed of a clock associated with a computer or microprocessor system.

The negative part of the signal corresponds to the deformation of the road due to the approach of the vehicle axle, as is described in French Patent No. 2673717. The passage of the axle illustrated in FIG. 3 will be physically embodied by inversion of the signal in the region (10), and by the appearance of a positive slope in the signal (i.e., ΔV/ΔT changes sign and becomes positive at (11)).

The appearance of a positive slope physically embodies the direct pressure of the tire on the sensor. It will in this way be possible to determine the start of an indentation due to the tire on the sensor.

The inversion of the curve in the region (12) physically embodies the maximum vertical force passing over the sensor (for example, a piezoelectric sensor). It will in this way be possible to determine the position of the axle which corresponds to the axis of the axle (13). Depending on the desired accuracy, this point could be physically embodied by inversion of the curve at the point (14) or by the intersection of the greatest positive and negative slopes to determine a point (13). It is therefore possible to determine a second characteristic position of the axle on the piezoelectric sensor.

It would also be possible to determine the point at which the indentation due to the tire of the axle is removed from the piezoelectric sensor using the second inversion of the curve, in the region (15). This point can be determined either by a whole period (16), or by the intersection of curves having the greatest slopes within a period ΔT of two scans given as the peak of the signal (17).

It is in this way possible to determine three characteristic instances for a tire passing over a sensor, including the start of the indentation due to the tire (or due to the axle) on the sensor, the axis of maximum vertical force generated by the tire on the sensor, and the indentation due to the tire on the sensor.

Figure 6:
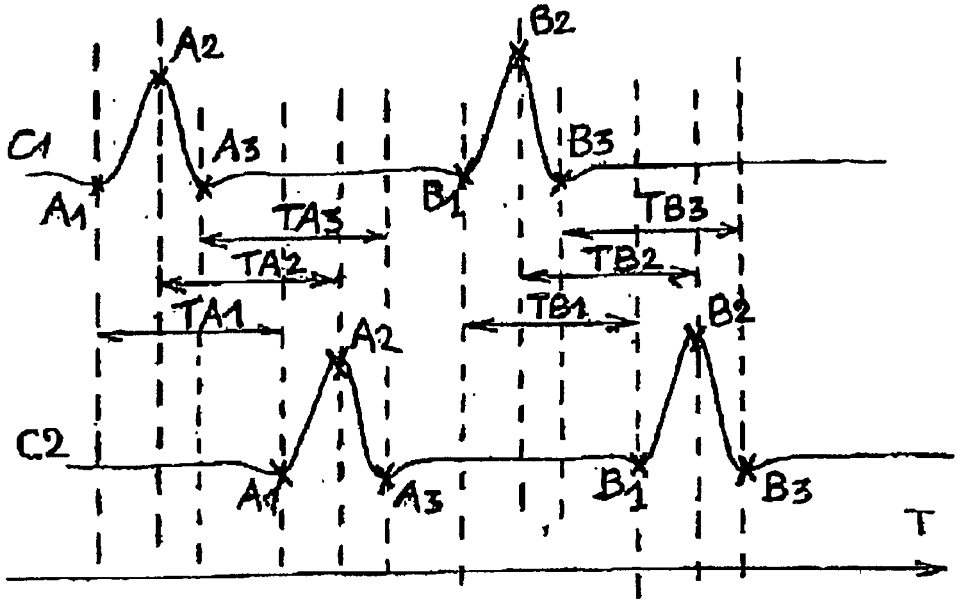
FIG. 6 shows the signal obtained when a vehicle with two axles passes over a group of two sensors installed with a known separation, and the measurement of speed from characteristic points on curves with an input impedance of 10 MΩ.

FIG. 6 describes axles A, B, successively passing over each of the sensors (C1) and (C2) of the assembly described in FIG. 1*b*. In this configuration, it is possible to determine three characteristic points, indexed as 1, 2 and 3, for each axle (A) and (B) passing over each of the sensors (C1) and (C2). Since the separation between the two sensors is clearly known and measured, it is possible to determine the speed of displacement at the start of the indentation, the speed at the "axle center" and the speed at the end of the indentation, for each axle between the two sensors (C1) and (C2). These speeds will be determined from the ratio of the separation of the sensors, divided by the times TA1, TA2 and TA3 for the first axle, by the times TB1, TB2 and TB3 for the second axle, and so on for each axle.

It can therefore be seen that it is possible to determine a maximum of six speeds for each vehicle with two axles. For vehicles with three axles, the determination of nine speeds is demonstrated, for vehicles with four axles, the determination of twelve speeds is demonstrated, and so on and so forth.

The measurement of three speeds for the same axle must give substantially identical values in order to verify the homogeneity of the measurements. A difference between the speeds of two successive axles may be characteristic of an accelerating or decelerating vehicle.

The system of the present invention also makes it possible to determine the dynamic weight of a vehicle, and its category, at the same time as the speed is being determined, as is described, for example, in French Patent No. 2673717. A measurement of two parameters characterizing the speed at the start of the indentation, and of the axes of the indentation, is also possible, making it possible to obtain a minimum of four speed measurements per vehicle.

Next examined will be the processing of signals with an impedance of between 40 and 100 kΩ. Such impedances, which are described in prior French Patent No. 2673717, make it possible to render the signal substantially symmetrical and to overcome the effects of road flexibility on the shape of the signal. On the other hand, such impedances can introduce a not insignificant time constant into the discharge of piezoelectric sensors, and into the asymptotic shape of the signal at the end of the passage of the axle. Such deformation does not allow the position of the end of the indentation due to the tire to be measured accurately.

Figure 7:
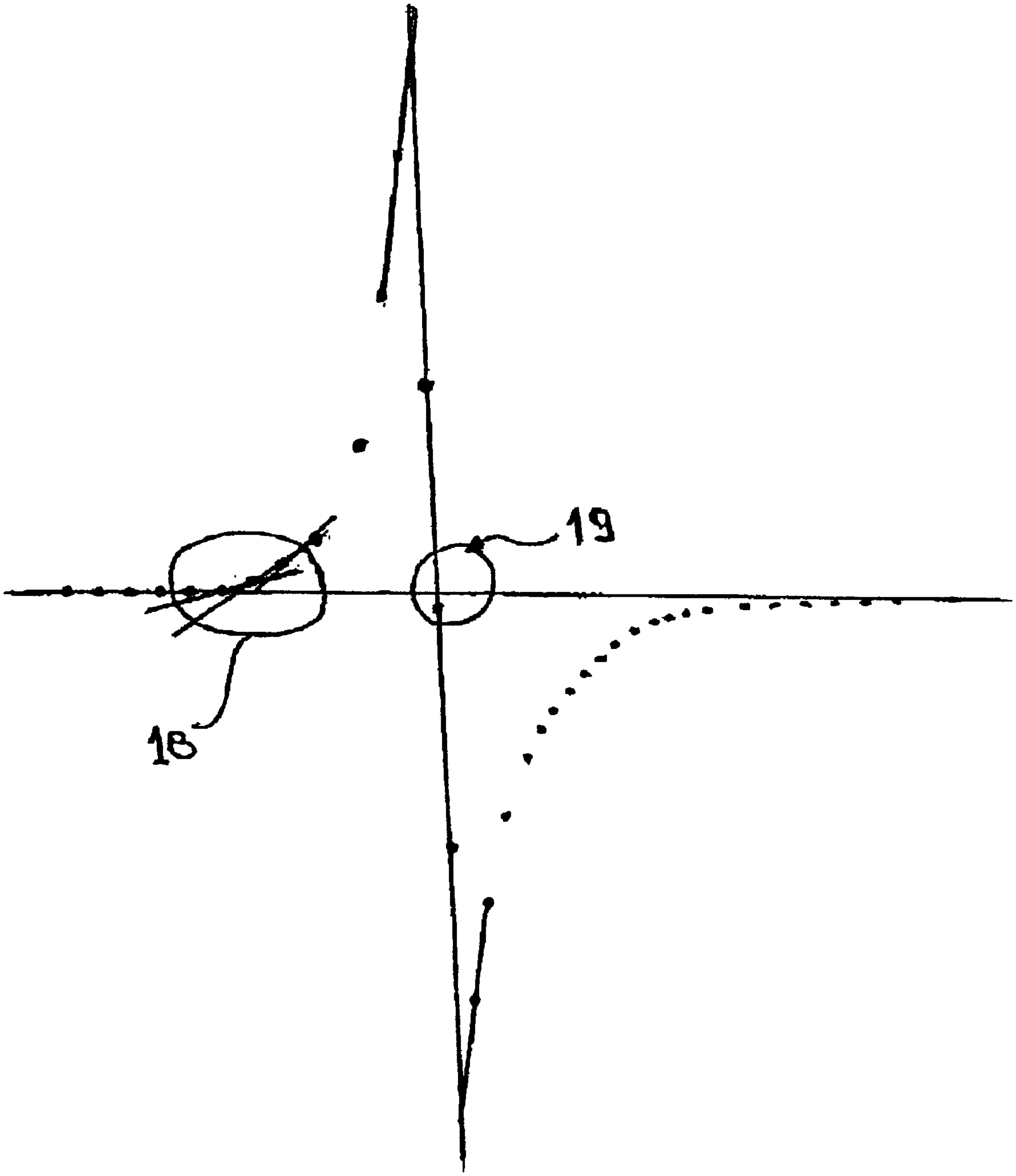
FIG. 7 shows the voltage variation obtained with an input impedance of about 40 to 100 kΩ, and its digitization.

The position at the start of an indentation due to a tire will be determined, as in the previous case, by the slope variation $\Delta V/\Delta T$ at the start of the signal (the region 18 shown in FIG. 7). The peak vertical force, corresponding substantially to the axis of the axle (hereinafter called "axle axis"), results in inversion of the signal, and in this signal passing through 0. The position of the axle axis will be determined by a zero voltage of the signal. This position will be accurate since the signal variation is very sudden (the region (19) shown in FIG. 7). The precise time at which the indentation due to the axle is removed from the sensor is itself poorly determined because of the electrical constants of the unit formed by the sensor and the electronics.

Figure 8:
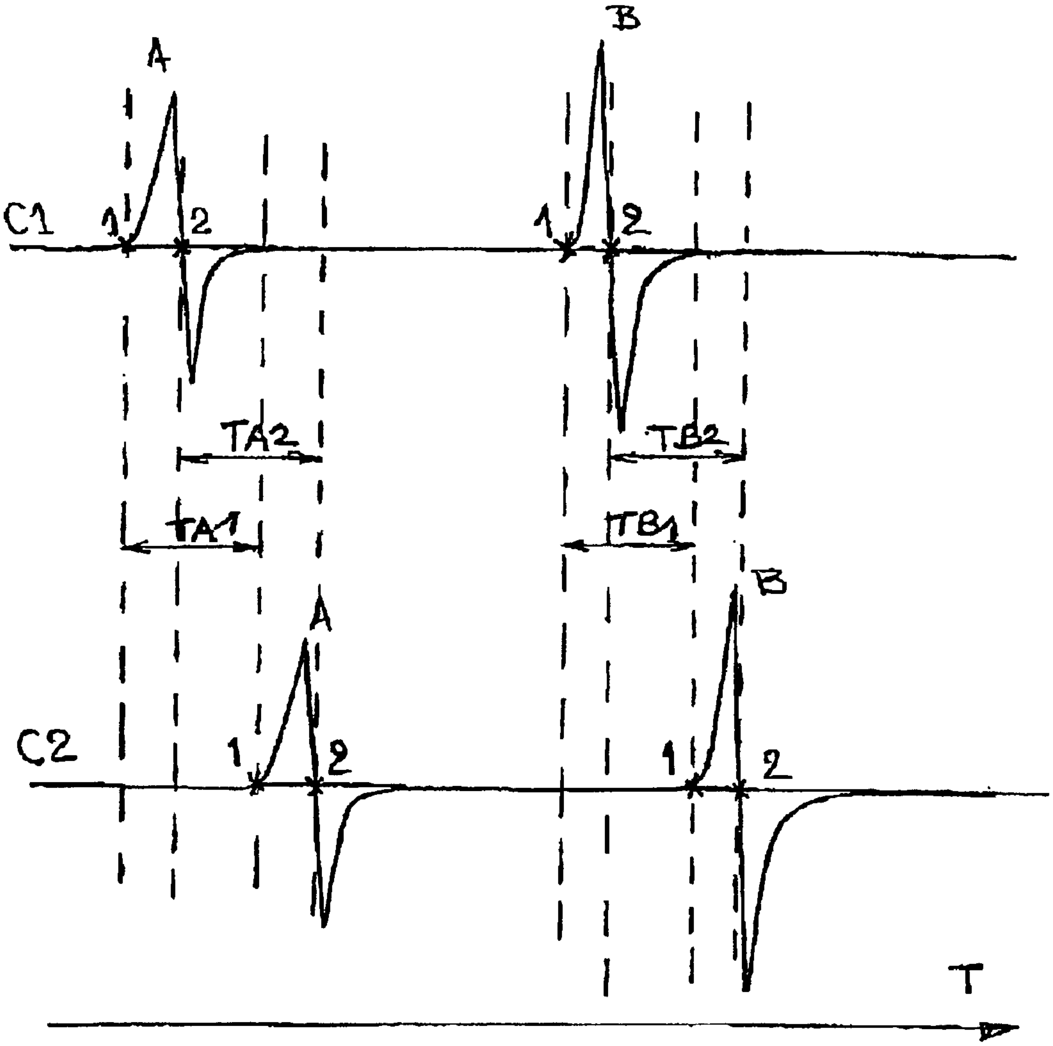
FIG. 8 shows the signal obtained when a vehicle with two axles passes over a group of two sensors installed with a known separation, and the measurement of speed from characteristic points on curves with an input impedance of 40 to 100 kΩ.

FIG. 8 gives the characteristic points at the start of an indentation, indexed as 1, and of the axle axis, indexed as 2, for each axle A, B, etc., on each of the sensors (C1) and (C2). Since the separation between the sensors is known, it is possible for the speed of each of the characteristic points of the axle to be easily calculated. The calculation is carried out by dividing the separation between the axes of the sensors by the times TA1 and TA2 for the first axle, and by the times TB1 and TB2 for the second axle.

It can be seen that it is possible to determine a minimum of two speeds per axle, and therefore a minimum of four speeds for a vehicle with two axles. As previously, a very small difference might be noticed between the speed of the two characteristic points of a given axle (i.e., a verification of an abnormal value), while the difference in speed between two axles can indicate a variation in the speed of a vehicle (acceleration or braking).

It can be seen that, using the foregoing methods, it is possible to accurately determine the speed of a vehicle and any variation in the vehicle's speed (acceleration or braking).

Figure 2A:
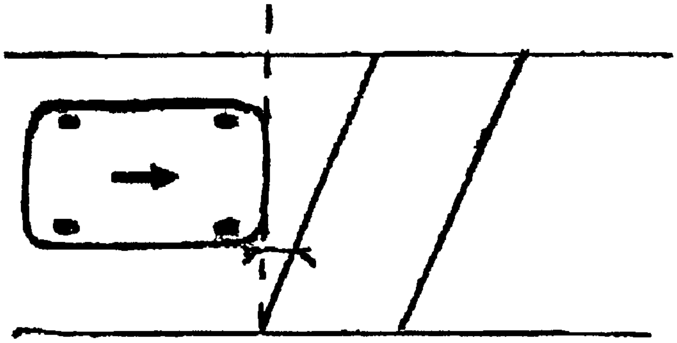
Figure 2B:
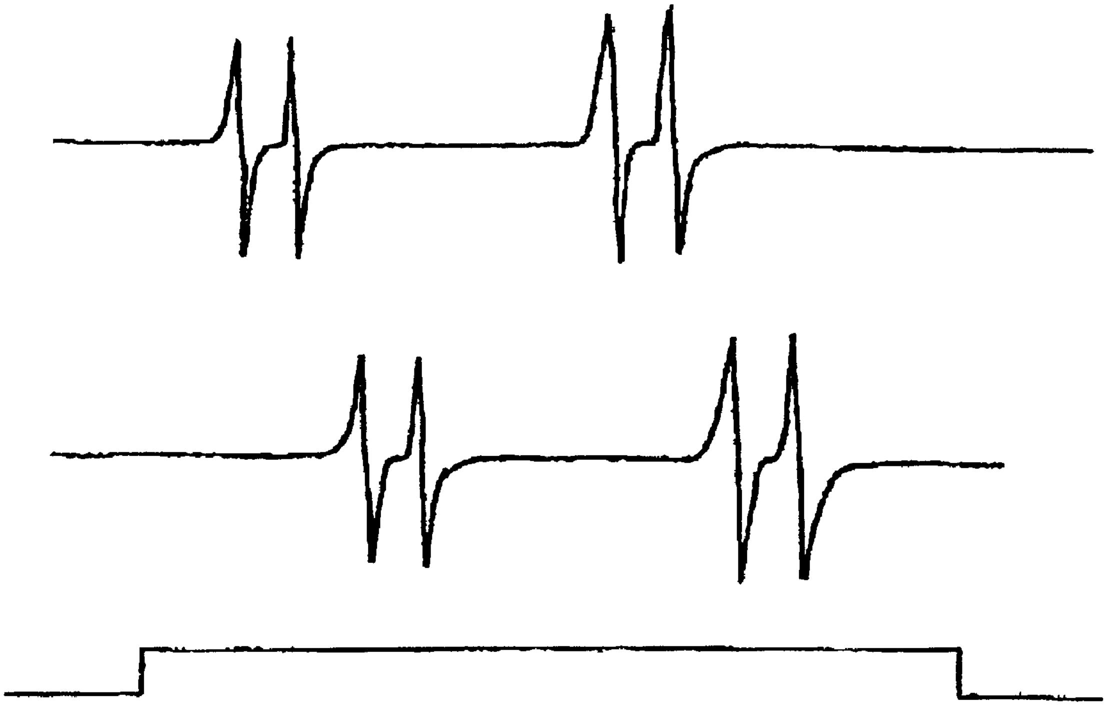

In the case of sensors inclined at an angle, as illustrated in FIGS. 2*a* and 2*b*, it will be possible to determine a series of speed measurements (two or three) for each wheel, and therefore, between eight and twelve measurements for a car or other vehicle with two axles.

The simultaneous determination of the category of the vehicle, and of its weight, can make it possible to introduce speed limits or warnings of speed limits being exceeded, depending on the vehicle type. This combination of properties can make it possible to trigger alarms or restraining measures.

Figure 10:
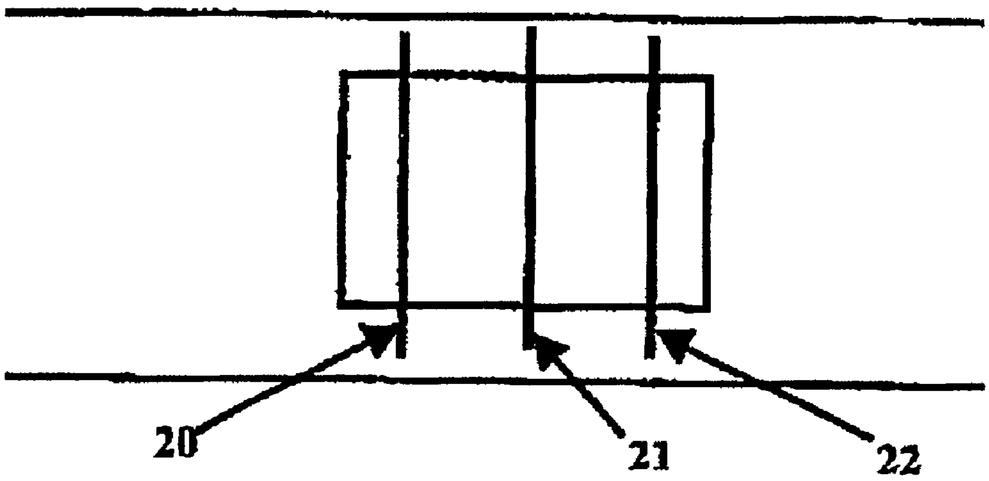
FIG. 10 shows a system which uses three sensors and one loop for speed measurement.

The device described above can also use a group of three parallel piezoelectric sensors combined with an induction loop (as is shown in FIG. 10), or with another means of detecting the vehicle body. The number of sensors can reach four or five, or more. In this last device, it is also possible to determine the speed of several characteristic points of each axle between the sensors (20) and (21), and (21) and (22), and between the sensors (20) and (22). It will in this way be possible to measure three speed groups per axle group of each vehicle.

The introduction of weather condition measurement can also make it possible to introduce variable speed thresholds depending on road conditions.

Figure 9:
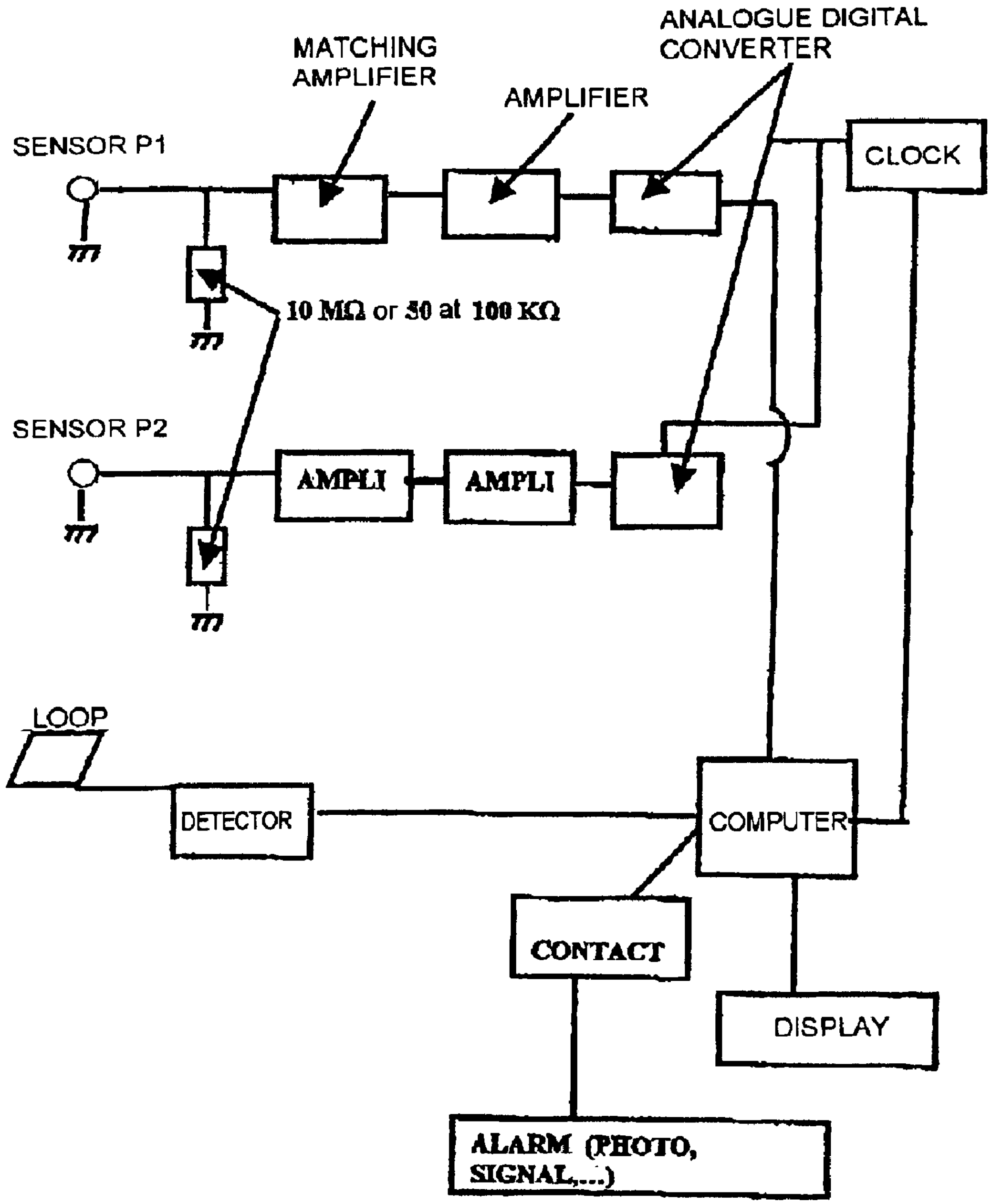
FIG. 9 shows an example of an electronic system for implementing the method of the present invention.

Electronic systems for implementing the foregoing operations are known, and are described in prior patents. Such systems use operational amplifiers, 16- or 32-bit microprocessors, etc., and FIG. 9 shows one possible, and non-limiting exemplary embodiment of a system in accordance with the present invention. The use of a system having characteristics including a separation (3) between the sensors of 1800 mm, a scan frequency giving a value $\Delta T$ between two samples of 200 $\mu$s, a quartz-stabilized system, and a 16-bit microprocessor with a 12-bit converter, will give tolerance intervals of ±1%, ±½ significant digit, for example, 1% ±0.5km/h, for systems displaying km/h.

What is claimed is:

1. A method for determining the speed of a vehicle passing over a roadway equipped with two coaxial, linear piezoelectric sensors, wherein the roadway defines an axis along which the vehicle passes, wherein the two sensors are parallel to each other, and wherein the method comprises the steps of:

sampling signals from the two sensors responsive to passage of an axle of the vehicle over the two sensors;

digitally processing the sampled signals from the two sensors to determine, responsive to the sampled signals from the two sensors, times when the passage of the axle produces each of three characteristic points corresponding to a starting point, an ending point, and a point corresponding to a maximum pressure generated by an indentation caused by the passage of the axle over each of the two sensors; and calculating from the digitally processed, sampled signals a speed value between the two sensors at each of the three characteristic points, and then calculating from the speed value between the two sensors at each of the three characteristic points a mean speed for the axle, a mean speed for the vehicle, and changes in the speed of the vehicle.

2. The method of claim 1 wherein the changes in the speed of the vehicle include accelerations and decelerations.

3. The method of claim 1 which further includes the step of determining the passage of the axle over the two sensors by detecting changes in pressure exerted by a tire associated with the axle over the sensors.

4. The method of claim 3 which further includes the step of determining the starting point, the ending point and the point corresponding to the maximum pressure generated by the tire on the sensors by detecting successive inversions of the signals from the sensors.

5. The method of claim 4 which further includes the step of determining the starting point of the indentation caused by the passage of the axle over the sensors by detecting a positive slope in the sampled signals.

6. The method of claim 5 which further includes the step of detecting the maximum pressure point by detecting sampled signals passing through a zero-point following successive inversions of the signals from the sensors.

7. The method of claim 1 which further includes the steps of determining the times of the three characteristic points for the axle, and calculating three speeds for each axle passing over the two sensors.

8. The method of claim 1 which further includes the step of positioning the sensors in the roadway substantially perpendicular to the axis of the roadway.

9. The method of claim 1 which further includes the steps of positioning the sensors in the roadway to form an angle of from 15 to 30° with respect to the axis of the roadway, and distinguishing each wheel associated with the axle of the vehicle.

10. The method of claim 9 which further includes the step of determining the three characteristic points of each wheel of the vehicle independently of any other wheels of the vehicle.

11. The method of claim 10 which further includes the step of determining up to a maximum of twelve speed values for a vehicle having two axles.

12. The method of claim 10 which further includes the step of using a detection of multiple speed values for each axle of the vehicle to eliminate abnormal values corresponding to small differences in speed between the corresponding characteristic points for the axle, and calculating the mean speed of the vehicle and the changes in the speed of the vehicle as a function of movement of the axle.

13. The method of claim 1 which uses only two sensors for making the speed determinations.

14. An apparatus including a converter which digitizes analog signals, and a processor coupled with the converter which determines times and speeds using the digitized signals for determining the speed of a vehicle passing over a roadway equipped with two coaxial, linear piezoelectric sensors, wherein the roadway defines an axis along which the vehicle passes, wherein the two sensors are parallel to each other, and wherein the apparatus performs steps comprising:

- sampling signals from the two sensors responsive to passage of an axle of the vehicle over the two sensors;
- digitally processing the sampled signals from the two sensors to determine, responsive to the sampled signals from the two sensors, times when the passage of the axle produces each of three characteristic points corresponding to a starting point, an ending point, and a point corresponding to a maximum pressure generated by an indentation caused by the passage of the axle over each of the two sensors; and
- calculating from the digitally processed, sampled signals a speed value between the two sensors at each of the three characteristic points, and then calculating from the speed value between the two sensors at each of the three characteristic points a mean speed for the axle, a mean speed for the vehicle, and changes in the speed of the vehicle.

15. The apparatus of claim 14 wherein the piezoelectric sensors have an input impedance which is greater than or equal to 10 MΩ.

16. The apparatus of claim 14 wherein the piezoelectric sensors have an input impedance which is between 40 and 100 kΩ.

* * * * *